(12) United States Patent
Shreiber et al.

(10) Patent No.: US 6,623,714 B2
(45) Date of Patent: Sep. 23, 2003

(54) OXYGEN SEPARATION METHOD USING A CERAMIC MEMBRANE UNIT

(75) Inventors: Eric Hunter Shreiber, Getzville, NY (US); Edward Paul Eardley, Lockport, NY (US); Vijayaraghavan Srinivasan, Williamsville, NY (US); Bart Antonie van Hassel, Getzville, NY (US); Minish Mahendra Shah, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 180 days.

(21) Appl. No.: 09/871,956

(22) Filed: Jun. 4, 2001

(65) Prior Publication Data
US 2002/0192135 A1 Dec. 19, 2002

(51) Int. Cl.[7] .............................................. B01D 53/22
(52) U.S. Cl. .................. 423/219; 60/39.12; 60/772; 60/774; 60/801; 95/45; 95/54; 95/288
(58) Field of Search ................................ 60/39.12, 772, 60/774, 801; 95/45, 54, 288; 423/219

(56) References Cited

U.S. PATENT DOCUMENTS

| | | | |
|---|---|---|---|
| 5,118,395 A | * 6/1992 | Chen et al. ............... 204/59 R |
| 5,516,359 A | 5/1996 | Kang et al. .................... 95/14 |
| 5,643,354 A | 7/1997 | Agrawal et al. .............. 75/490 |
| 5,657,624 A | * 8/1997 | Kang et al. ................ 60/39.02 |
| 5,753,007 A | 5/1998 | Russek et al. ................. 95/41 |
| 5,852,925 A | 12/1998 | Prasad et al. .............. 60/39.02 |
| 5,976,223 A | 11/1999 | Prasad et al. .................. 95/54 |
| 6,161,375 A | * 12/2000 | Keenan .................... 60/39.182 |
| 6,508,053 B1 | * 1/2003 | Ha et al. .................... 60/39.12 |

OTHER PUBLICATIONS

Dyer et al., "Ion Transport Membrane Technology for Oxygen Separation and Syngas Production", Solid State Ionics 134 (2000) pp 21–33.

Wright et al., "Advanced Oxygen Separation Membranes", Gas Research Institute (1990) pp 33–61.

* cited by examiner

Primary Examiner—Stanley S. Silverman
Assistant Examiner—Timothy C. Vanoy
(74) Attorney, Agent, or Firm—David M. Rosenblum (57) ABSTRACT

A method of separating oxygen using a ceramic membrane unit having one or more ceramic membranes, preferably formed of a mixed conducting ceramic, for instance, a perovskite, capable of conducting both oxygen ions and electrons. Oxygen is separated within the ceramic membrane unit under impetus of compressing an incoming oxygen containing feed. The compressor used in the compression is powered by the work of expansion produced by expanding a process stream composed of at least a portion of the retentate produced in the ceramic membrane unit. Prior to expansion, the process stream is cooled to allow the use of less expensive materials in expanders used in the expansion. As a result, expansion of the process stream alone is insufficient to meet the power requirements involved in the compression. Interstage expansion with reheating is used to make up for the power deficit.

20 Claims, 11 Drawing Sheets

OXYGEN SEPARATION METHOD USING A CERAMIC MEMBRANE UNIT

FIELD OF THE INVENTION

The present invention relates to a method of separating oxygen from an oxygen containing gas with the use of an ceramic membrane unit. More particularly, the present invention relates to such a method in which the oxygen containing gas is compressed by a compressor powered by the expansion of a cooled process stream made up at least in part by a retentate formed in the ceramic membrane unit. Even more particularly, the present invention relates to such a method in which the expansion of the process stream is carried out in stages with interstage heating.

BACKGROUND OF THE INVENTION

Oxygen transport membranes have demonstrated an ability to separate high-purity oxygen from an oxygen containing stream with a purity of at least about 99% and with an oxygen recovery of about 60%. Such oxygen transport membranes are formed from a ceramic that is capable of transporting oxygen ions when both heated to a suitable operational temperature and the opposite sides of the membrane are subjected to an oxygen partial pressure differential. The oxygen ions are formed by oxygen atoms in an oxygen containing feed gaining two electrons at one surface of the membrane. The oxygen is reconstituted at the opposite surface of the membrane by the loss of the electrons from the oxygen ions thus to complete the separation of the oxygen from the feed. Typically, multiple oxygen transport membranes are housed in a ceramic membrane unit that functions to separate oxygen from the oxygen containing feed to produce both an oxygen permeate from the separated oxygen and a retentate from the feed after the separation of oxygen therefrom.

Suitable oxygen transport membrane materials are known as either mixed conducting or ionic. Mixed conducting materials conduct both the oxygen ions and the electrons that are formed upon reconstitution of elemental oxygen from the oxygen ions. Ceramic mixed conducting materials include but are not limited to perovskites. Ionic materials conduct only oxygen ions and thus require an external electric circuit for the return of the electrons. Common materials used in an ionic membrane include, but are not limited to, Yttrium Stabilized Zirconia.

In order to compress the oxygen containing feed, for instance, air, the feed is compressed in a compressor that is powered at least in part by the work extracted from a turboexpander. Typically, a retentate stream, composed of a retentate formed upon separation of the oxygen within the ceramic membrane unit, is expanded in the turboexpander. An example of this is shown in U.S. Pat. No. 5,516,359 in which feed air is compressed and then heated in a direct-fired burner. The resultant heated feed gas is introduced into the ceramic membrane unit to separate oxygen from the feed. The retentate is heated by another direct fired burner prior to its introduction into the turboexpander. The turboexpander is used to power the compressor.

U.S. Pat. No. 5,643,354 discloses an integrated process in which oxygen is recovered from an oxygen-containing feed gas and subsequently is consumed in a coal gasifier. The hot oxygen product exiting the ceramic membrane unit is cooled through indirect heat exchange with water and an expander is used to recover the work needed to drive the feed gas compressor.

"Ion Transport Membrane Technology for Oxygen Separation and Syngas Production", 134 Solid State Ionics, Dyer et al. pp 21–33 (2000), discloses a process in which a hot, low-pressure oxygen product gas, produced by a ceramic membrane unit, is cooled by indirect heat exchange with a cooling medium. After being cooled, the oxygen is compressed to a final delivery pressure. Fuel is used both to heat the feed gas to the desired inlet temperature of the oxygen transport membranes contained in the ceramic membrane unit and to heat the non permeate (i.e., retentate) to the desired inlet temperature to the expander. The work recovered from the expander is used to drive both the feed gas compressor and an oxygen product blower or compressor.

"Advanced Oxygen Separation Membranes", Report No. TDA-GRI-90/0303, Wright et al., The Gas Research Institute, pp 33–61 (1990), illustrates various schemes for integrating ceramic membrane units with electrical generation systems. In one such integration, feed air is compressed and heated by combustion supported by oxygen contained in a retentate stream that is produced in a ceramic membrane unit. The retentate stream is then fed into a turboexpander that is used to drive a feed air compressor.

U.S. Pat. No. 5,753,007 discloses a process for oxygen recovery from an oxygen-containing feed gas by the use of a ceramic membrane unit in which the retentate stream is cooled and then expanded to recover useful work. In this patent, the degree of cooling is sufficiently high that the work can be extracted for the use of processes that are less energetic than those in which electrical power also is generated. The feed gas can be heated through indirect heat exchange with both the retentate and oxygen product streams. Additionally, the feed stream may be heated further by a combustor interposed prior to the ceramic membrane unit.

An important consideration in the fabrication of any equipment that is used to separate oxygen is its cost. The cost of acquiring a turboexpander increases with its operating temperature due to the use of more exotic and/or more expensive materials. It therefore would be desirable from the standpoint of cost to be able to utilize a turboexpander at a lower temperature, for instance, preferably in a range of between about 300° C. and about 650° C. However, as the inlet temperature to the turboexpander decreases, there is less energy that can be extracted from a stream to be expanded and, therefore, less energy that is available to drive the feed air compressor. The energy able to be extracted from a stream sufficiently cooled to allow the use of turboexpanders designed to operate at low temperatures can be less than that required to operate the feed air compressor.

As will be discussed, the present invention provides a method of separating oxygen from an oxygen containing feed that is particularly applicable to the use of temperature limited turboexpander components and that can generate sufficient energy from the turboexpansion to drive the feed air compressor as well as other components. Other advantages will become apparent from the following discussion.

SUMMARY OF THE INVENTION

A method of separating oxygen from an oxygen containing gas is provided in which a feed stream containing the oxygen containing gas is compressed to produce a compressed feed stream. The compressed feed stream is heated. A ceramic membrane unit also is heated to an operational temperature. Oxygen is separated from the compressed feed stream within the ceramic membrane unit to produce both a retentate that contains residual components of the feed stream and an oxygen permeate formed by the separated oxygen. A process stream composed of at least a portion of the residual components of the retentate is cooled to a temperature below the operational temperature of the ceramic membrane unit. The process stream is expanded with the performance of work in an initial stage of expansion. An expansion stage, as described herein, is comprised of all system components that may be utilized to recover work from an inlet stream. Initial and subsequent stages of expansion are separated by a separate reheating step in which the expanded stream is reheated prior to entering the next stage of expansion. The process stream, after the initial stage of expansion, is reheated, then expanded with the performance of work in a subsequent stage of expansion.

The work of expansion produced by the initial stage of expansion is insufficient to meet the power requirements for the compression of the feed stream, and a sum of the work of expansion of the initial and subsequent expansion stages is at least sufficient to meet the power requirements for the compression of the feed stream. At least a part of a sum of the work of expansion of the initial and subsequent stages of expansion is applied to the compression of the feed stream. An oxygen product stream is extracted from the ceramic membrane unit that is composed of the oxygen permeate.

By having more than one stage of expansion with interstage reheating, sufficient energy can be recovered to power the compressor and, as will be discussed, additional accessories such as product and fuel compressors. At the same time, since the process stream is cooled, less expensive, temperature limited expanders can be utilized. Additionally, the method of the present invention also allows the temperature of the ceramic membranes of the ceramic membrane unit to be set independently of the temperature of the stream to be expanded for power recovery. This can be important when specific low operating temperatures are required for the longevity of the material used in the ceramic membrane.

In accordance with an additional aspect of the present invention, the residual components contained within the retentate include residual oxygen; and the process stream is formed by extracting a retentate stream from the ceramic membrane unit, introducing a fuel stream into the retentate stream, and combusting the fuel in the presence of the residual oxygen contained within the retentate stream. The compressed feed stream is heated through indirect heat exchange with the process stream, thereby cooling the process stream. The compressed feed stream, after having been heated, is introduced into the ceramic membrane unit to separate part of the oxygen contained within the compressed feed stream, thereby heating the ceramic membrane unit to the operational temperature. Thus, in this aspect of the present invention, the energy for heating the feed stream, and therefore the ceramic membrane unit, to an operational temperature is through indirect heat exchange with a process stream formed by combusting a fuel in the presence of residual oxygen in the retentate.

In another aspect of the present invention, the process stream is formed from a retentate stream composed of the retentate and extracted from the ceramic membrane unit. The compressed feed stream is heated through indirect heat exchange with the process stream, thereby cooling the process stream. A heated feed stream is formed by introducing a fuel stream into the compressed feed stream, after having been heated, and combusting the fuel in the presence of part of the oxygen contained within the compressed feed stream. The heated feed stream is introduced into the ceramic membrane unit to separate a remaining part of the oxygen contained within the compressed feed stream, thereby forming the oxygen permeate and heating the ceramic membrane unit to its operational temperature.

In yet another aspect of the present invention, the residual components include residual oxygen, and the compressed feed stream is heated through indirect heat exchange with a retentate stream extracted from the ceramic membrane unit. The compressed feed stream, after having been heated, is divided into first and second subsidiary streams. The process stream is formed by combining the retentate stream with the first subsidiary stream and a fuel stream and combusting the fuel stream in the presence of oxygen contained in said retentate stream and the first subsidiary stream. The second subsidiary stream is heated indirectly from the combustion of the fuel stream, thereby cooling said process stream. The second subsidiary stream is introduced into the ceramic membrane unit to separate the oxygen contained therein to form the oxygen permeate and to heat said ceramic membrane unit to its operational temperature.

It is to be noted that the operational temperature can be in a range from between about 600° C. and about 1200° C. The temperature below said operational temperature to which said process stream is cooled is preferably in a range of between about 300° C. and about 650° C. Further, after said initial stage of expansion, the process stream is reheated preferably to a reheated temperature in a range of between about 350° C. and about 650° C.

In any of the foregoing aspects of the present invention, the expansion exhaust stream can be reheated through indirect heat exchange with the oxygen product stream. Additionally, when the sum of the work of expansion is in excess of that required to compress the feed stream, the sum of said work of expansion is applied additionally to compression of the fuel and oxygen product streams. The expansion exhaust stream is reheated preferably through indirect heat exchange with the oxygen product stream. The ceramic membrane unit can be purged with either a reactive or non-reactive purge stream to increase the separation of the oxygen.

The use of a reactive purge also can be used in connection with a method of the present invention that is designed to produce a nitrogen product. In such a method, a retentate stream is extracted from the ceramic membrane unit and introduced into a further ceramic membrane unit. A reactive purge stream is introduced into the further ceramic membrane unit to separate further oxygen from the retentate stream and thereby to produce a further retentate and further oxygen permeate. In accordance with such a method, the process stream is formed from said further retentate. The compressed feed stream is heated through indirect heat exchange with the process stream and/or a further oxygen permeate stream, composed of the further oxygen permeate. The compressed feed stream, after having been heated, is introduced into the ceramic membrane unit to separate the oxygen therefrom and to heat the ceramic membrane unit to its operational temperature. A nitrogen product stream is formed at least in part from a subsequent expansion exhaust stream that is produced from the subsequent expansion. The expansion exhaust stream can be reheated through indirect heat exchange with both the product stream and the further oxygen permeate stream after its having exchanged heat with the compressed feed stream.

In the aforementioned aspect of the present invention, when the sum of said work of expansion is in excess of that required to compress the feed stream, the subsequent expansion exhaust stream can be divided into first and second nitrogen containing streams. The first nitrogen containing stream is used to form the nitrogen product stream, and the reactive purge stream is formed from a fuel stream and said second nitrogen containing stream. The reactive purge and oxygen product streams are compressed, and the sum of said work of expansion is applied additionally to compression of the reactive purge and oxygen product streams.

In accordance with another method of the present invention that can be used to produce a nitrogen product, the compressed feed stream is heated through indirect heat exchange with the process stream. A heated feed stream is formed by introducing a fuel stream into the compressed feed stream, after having been heated, and the fuel is combusted in the presence of part of the oxygen contained within the compressed feed stream. The heated feed stream is introduced into the ceramic membrane unit to separate a remaining part of the oxygen contained within the compressed feed stream and to heat the ceramic membrane unit to its operational temperature. A retentate stream is extracted from the ceramic membrane unit and is introduced into a further ceramic membrane unit. A reactive purge stream is introduced into the further ceramic membrane unit to separate further oxygen from the retentate stream and thereby to produce a further retentate and further oxygen permeate. The process stream is formed from the further retentate, and a nitrogen product stream is formed at least in part from a subsequent expansion exhaust stream produced from the subsequent expansion. The process stream can be reheated through indirect heat exchange with the product stream and the further oxygen permeate stream.

With respect to the foregoing aspect of the present invention, the sum of said work of expansion is in excess of that required to compress the feed stream. A first nitrogen containing stream, composed of part of the process stream, forms the nitrogen product stream. The reactive purge stream is formed from a further fuel stream and a second nitrogen containing stream composed of a further part of the process stream. The fuel and oxygen product streams are compressed and the sum of the work of expansion is additionally applied to compression of said fuel and oxygen product streams.

A method of the present invention can be adapted for use of a low pressure burner. In accordance with such adaptation, the process stream is formed from a retentate stream composed of the retentate and extracted from the ceramic membrane unit. The compressed feed stream is heated through indirect heat exchange with heat generated through combustion of a fuel and through indirect heat exchange with the process stream, thereby cooling said process stream. The process stream is reheated through indirect heat exchange with a flue gas stream composed of flue gas produced from the combustion of the fuel and the oxygen product stream. The compressed feed stream can be heated through further indirect heat exchange with the heat generated through combustion of the fuel, so that the compressed feed stream initially undergoes the indirect heat exchange with the process stream and subsequently undergoes the indirect heat exchange with heat generated through combustion of the fuel, prior to the further indirect heat exchange. The ceramic membrane unit optionally may be subjected to a purge with steam to increase the oxygen separation. The process stream and an auxiliary air stream can be preheated through indirect heat exchange with the heat generated through the combustion of the fuel. The streams can then be used to support the combustion of the fuel.

It is to be noted, that the term, "ceramic membrane unit" as used herein and in the claims means any type of reactor that can be used to separate oxygen from an oxygen containing stream and that utilizes oxygen transport membranes, either mixed conducting or ionic, for such separation.

BRIEF DESCRIPTIONS OF THE DRAWINGS

While the specification concludes with claims distinctly pointing out the subject matter that Applicants regard as their invention, it is believed that the invention will be better understood when taken in connection with the accompanying drawings in which:

The same reference numbers were carried through the drawings for elements that had the same function and/or design in order to avoid needless repetition in the description of such elements.

DETAILED DESCRIPTION

Figure 1:
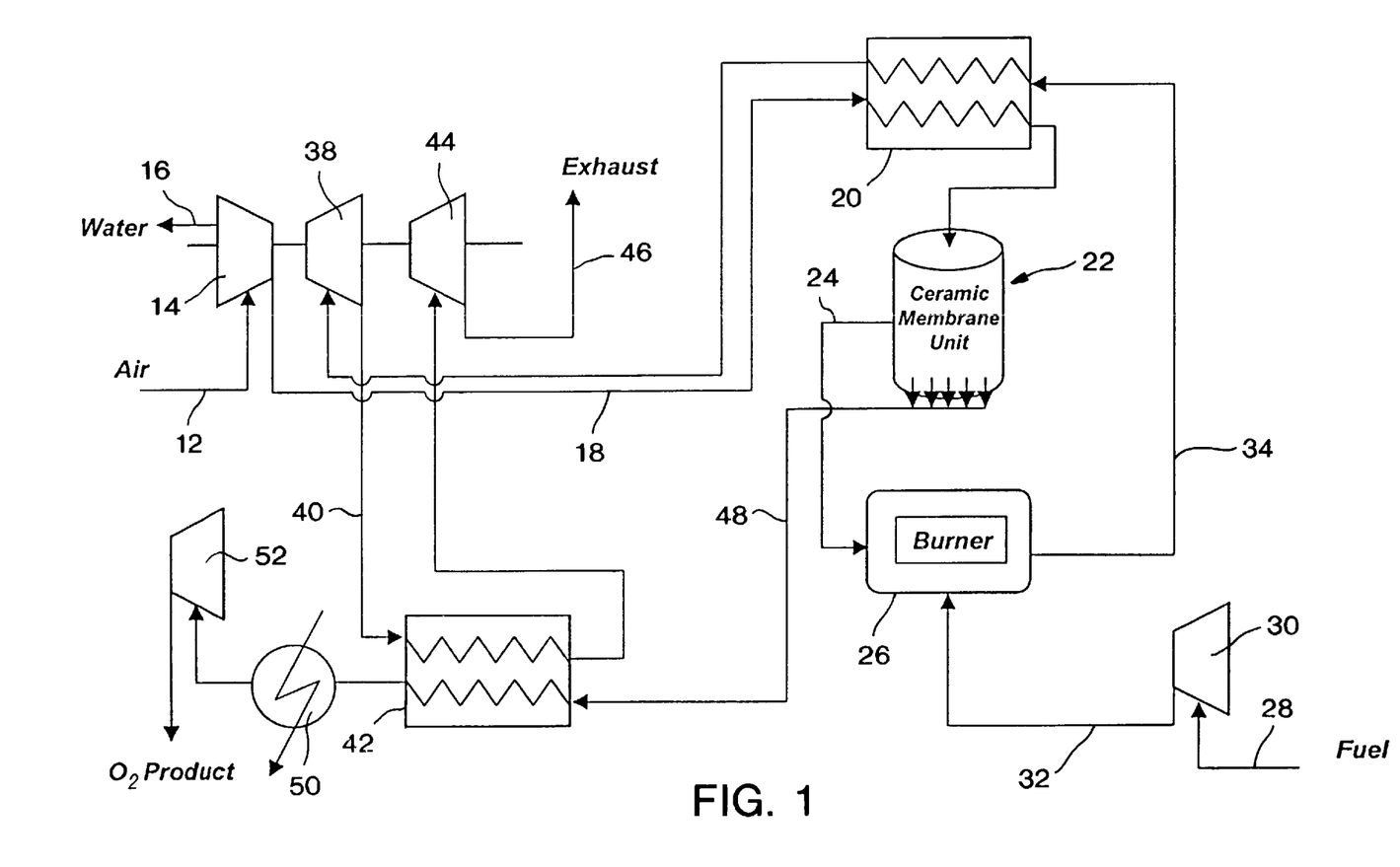
FIG. 1 is a schematic, process flow diagram of an apparatus used in carrying out a method in accordance with the present invention.

With reference to FIG. 1 an apparatus is illustrated for separating oxygen from an oxygen containing gas contained within a feed stream 12, typically air. Feed stream 12 is compressed by a feed air compressor 14 which can utilize interstage cooling between stages to produce a stream 16 composed of condensed water. The resultant compressed feed stream 18 is heated within a feed heater 20 and then is introduced into a ceramic membrane unit 22. Ceramic membrane unit 22 contains one or more oxygen transport membranes. These ceramic membranes may be of any configuration, including but not limited to planar or tubular. Preferably, the oxygen transport membranes are fabricated from a mixed conducting ceramic. Compressed feed stream 18 heats the oxygen transport membranes contained within ceramic membrane unit 22 to their operational temperature and also produces a pressure differential across the oxygen transport membranes. This separates a portion of the oxygen from compressed feed stream 18 to produce an oxygen permeate and a retentate containing residual components of compressed feed stream 18 that have not separated. For instance, in the illustrated case, the residual components would include nitrogen, argon, other potential residual feed air components, and any oxygen that has not separated from compressed feed stream 18.

A retentate stream 24 composed of the retentate is introduced into a direct fired burner 26 to support combustion of a fuel, for instance, natural gas. A fuel stream 28, containing the fuel, is compressed to the pressure of retentate stream 24 by means of a compressor 30 to produce a compressed fuel stream 32. Compressed fuel stream 32 is introduced thereupon into direct fired burner 26. The combustion of the fuel produces a process stream 34 that is composed of at least a portion of the residual components of the retentate, for instance, nitrogen and also combustion products produced from the combustion of the fuel.

Process stream 34 is introduced into feed heater 20 to heat compressed feed stream 18 to the operational temperature of the oxygen transport membranes contained within ceramic membrane unit 22. The resultant indirect heat exchange cools process stream 34 to a temperature below such operational temperature. As mentioned above, process stream 34 can be cooled sufficiently to enable it to be used with turboexpanders fabricated from less expensive, low temperature materials.

Process stream 34 is introduced into an initial stage of expansion provided by a turboexpander 38 that is coupled to feed gas compressor 14. In this regard the term "coupled" does not necessarily mean a mechanical coupling. Commonly, turboexpander 38 is coupled to a generator which can be used to produce electricity, which in turn is used to drive feed gas compressor 14. The electricity is not necessarily applied directly to feed gas compressor 14. For instance, the electricity can be returned to the power grid from which electricity is distributed to feed gas compressor 14.

The work of expansion produced by turboexpander 38 does not generate sufficient power to run feed gas compressor 14. In order to gain the requisite energy, process stream 34, which after expansion is designated as exhaust stream 40, is reheated within an expander interstage heater 42 and then introduced into a second stage of expansion that is provided by a turboexpander 44. The resultant turboexpander exhaust stream 46 is discharged from turboexpander 44. The reheating adds the requisite energy to run feed air compressor 14 as well as other accessories.

Process stream 34 is reheated by an oxygen product stream 48 that is composed of the oxygen permeate produced within ceramic membrane unit 22. Oxygen product stream 48 is introduced into expander interstage heater 42 in indirect heat exchange with process stream 34 (exhaust stream 40). Oxygen product stream 48 optionally may be cooled thereafter in an aftercooler 50 and compressed by a product compressor 52 to produce an oxygen product at pressure. The amount of energy produced by the initial and subsequent stages of expansion produced by turboexpanders 38 and 44 is sufficient to run not only the feed air compressor 14, but also compressor 30 for compressing the fuel stream 28 and product compressor 52 for compressing oxygen product stream 48.

Figure 2:
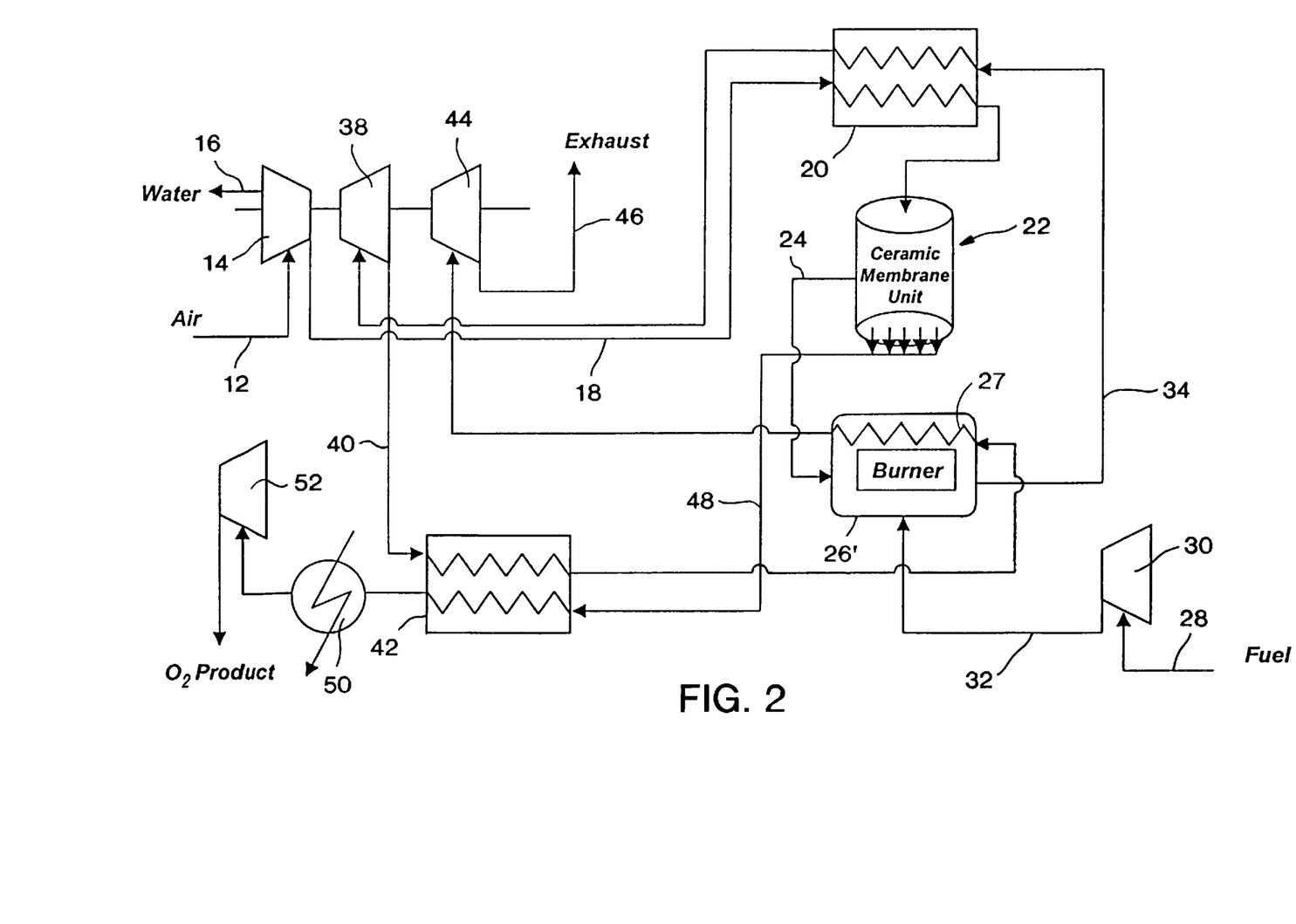
FIG. 2 is a schematic, process flow diagram of alternative embodiment of the method illustrated by FIG. 1.

With reference to FIG. 2, interstage reheating of process stream 34 is effectuated in part by expander interstage heater 42 and a burner 26' which is provided with a heat exchange pass 27 to produce a further reheating of process stream 34 through combustion of fuel within burner 26'. The advantage of this embodiment of the present invention is that it allows for lower operational temperatures of ceramic membrane unit 22 without compromising the operation of any of the stages of expansion.

Figure 3:
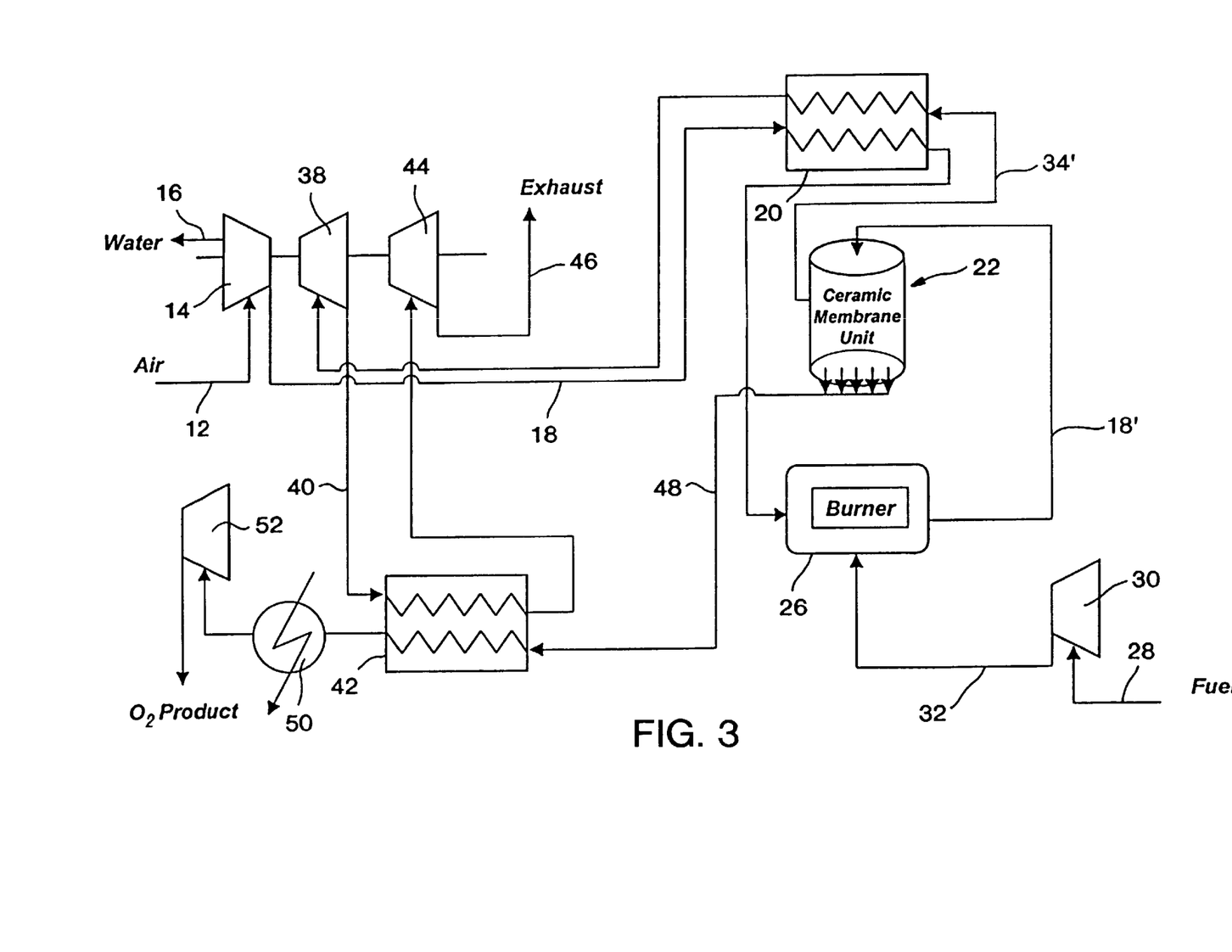
FIG. 3 is a schematic, process flow diagram of an apparatus used in carrying out an alternative embodiment of a method in accordance with the present invention.

With reference to FIG. 3, a slightly different method is used to heat the ceramic membrane unit 22 to its operational temperature and to generate the process stream to be expanded (designated by reference number 34').

In this embodiment, the compressed feed stream 18 is heated in part through indirect heat exchange within feed heater 20, and then is heated further within direct fired burner 26 to produce a heated feed stream 18'. Heated feed stream 18' is introduced into ceramic membrane unit 22. The process stream 34' contains such components as residual oxygen that has not been consumed in the combustion of the fuel, combustion products from such combustion, and nitrogen.

Figure 4:
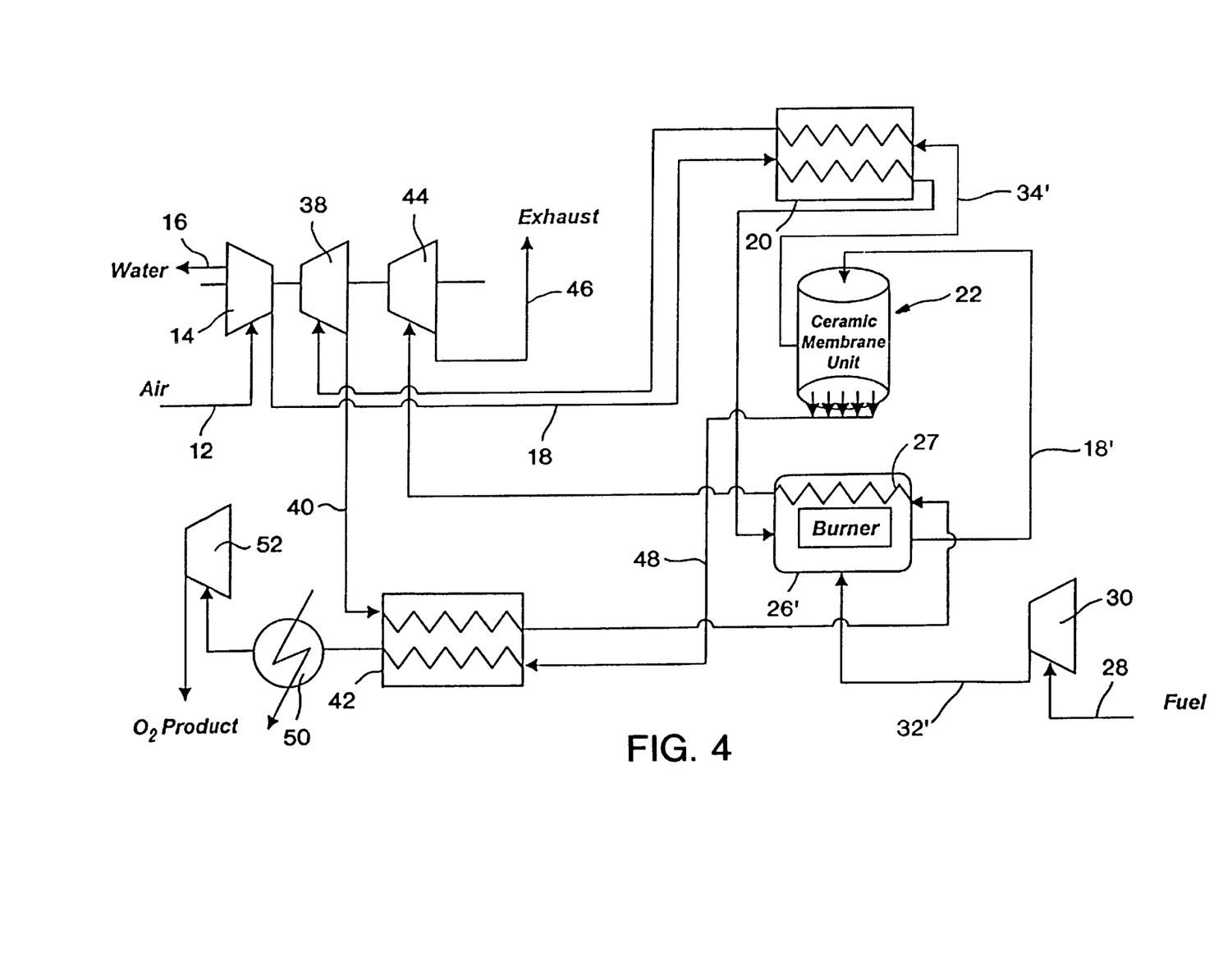
FIG. 4 is a schematic, process flow diagram of alternative embodiment of the method illustrated by FIG. 3.

With reference to FIG. 4, an alternative embodiment is illustrated that is similar to the embodiment of FIG. 3. However, direct fired burner 26' of FIG. 2 is utilized to split the interstage heating duty of process stream 34' between expander interstage heater 27 and direct fired burner 26'.

Figure 5:
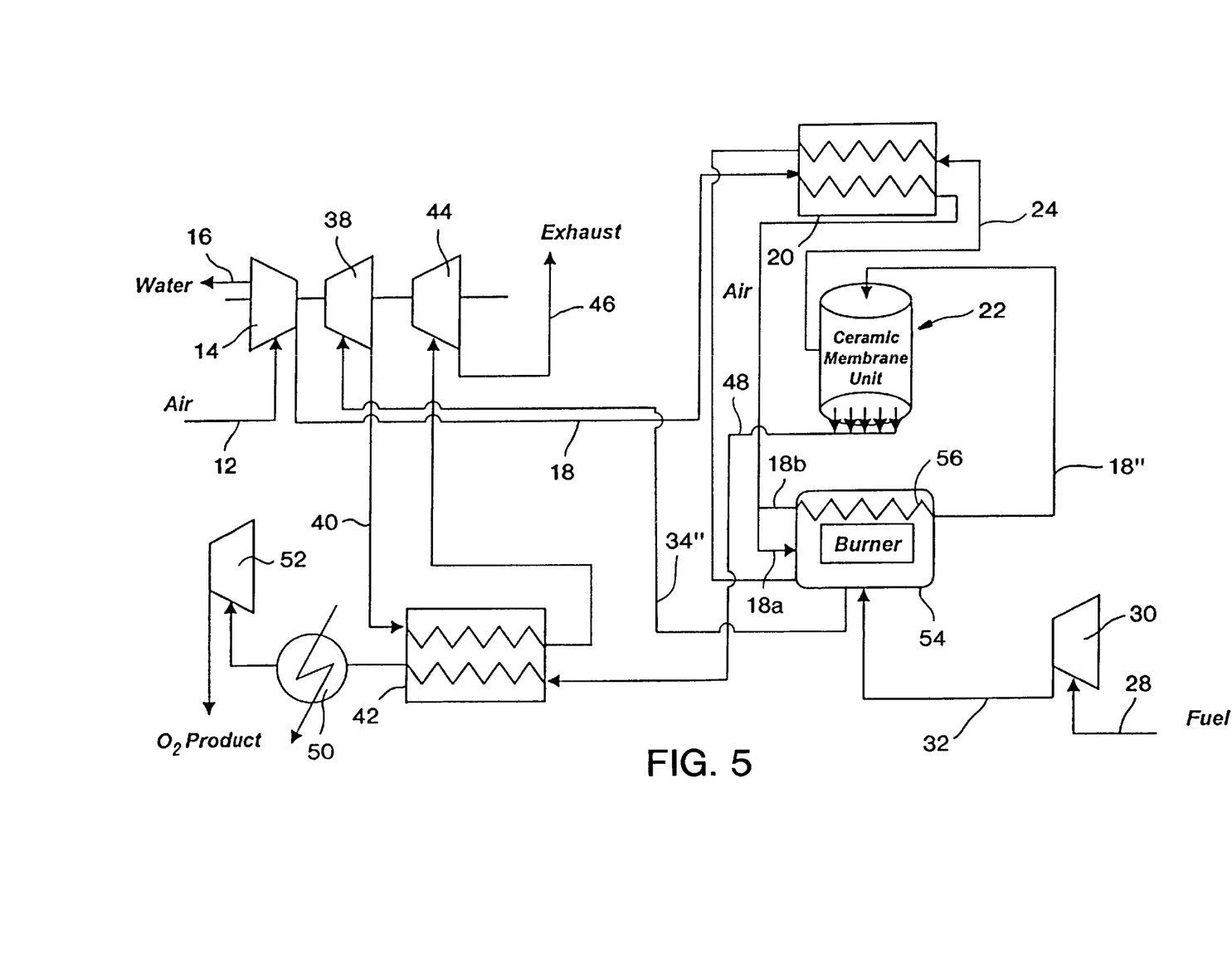
FIG. 5 is a schematic, process flow diagram of an apparatus used in carrying out an alternative embodiment of a method in accordance with the present invention that utilizes a burner of the type shown in FIG. 4.

FIG. 5 illustrates an embodiment of the present invention that combines several aspects of the aforementioned embodiments. A burner 54 is utilized that is provided with a heat exchange pass 56 (similar in design to heat exchange pass 27) and an additional inlet for an auxiliary air stream. Compressed feed stream 18, after having been heated within feed heater 20, is divided into first and second subsidiary streams 18a and 18b, respectively. Retentate stream 24 is passed through feed heater 20 to heat compressed feed stream 18. Subsequently, both the cooled retentate stream and the first subsidiary stream 18a are introduced into burner 54. The resultant process stream 34" contains nitrogen, any oxygen that has not been consumed in the combustion of fuel 28, and the combustion products obtained from the combustion of fuel 28. Second subsidiary stream 18b is passed through heat exchange pass 56 of burner 54. Second subsidiary stream 18b is heated within heat exchange pass 56 to form a stream 18" that is introduced into ceramic membrane unit 22 for oxygen separation.

Figure 6:
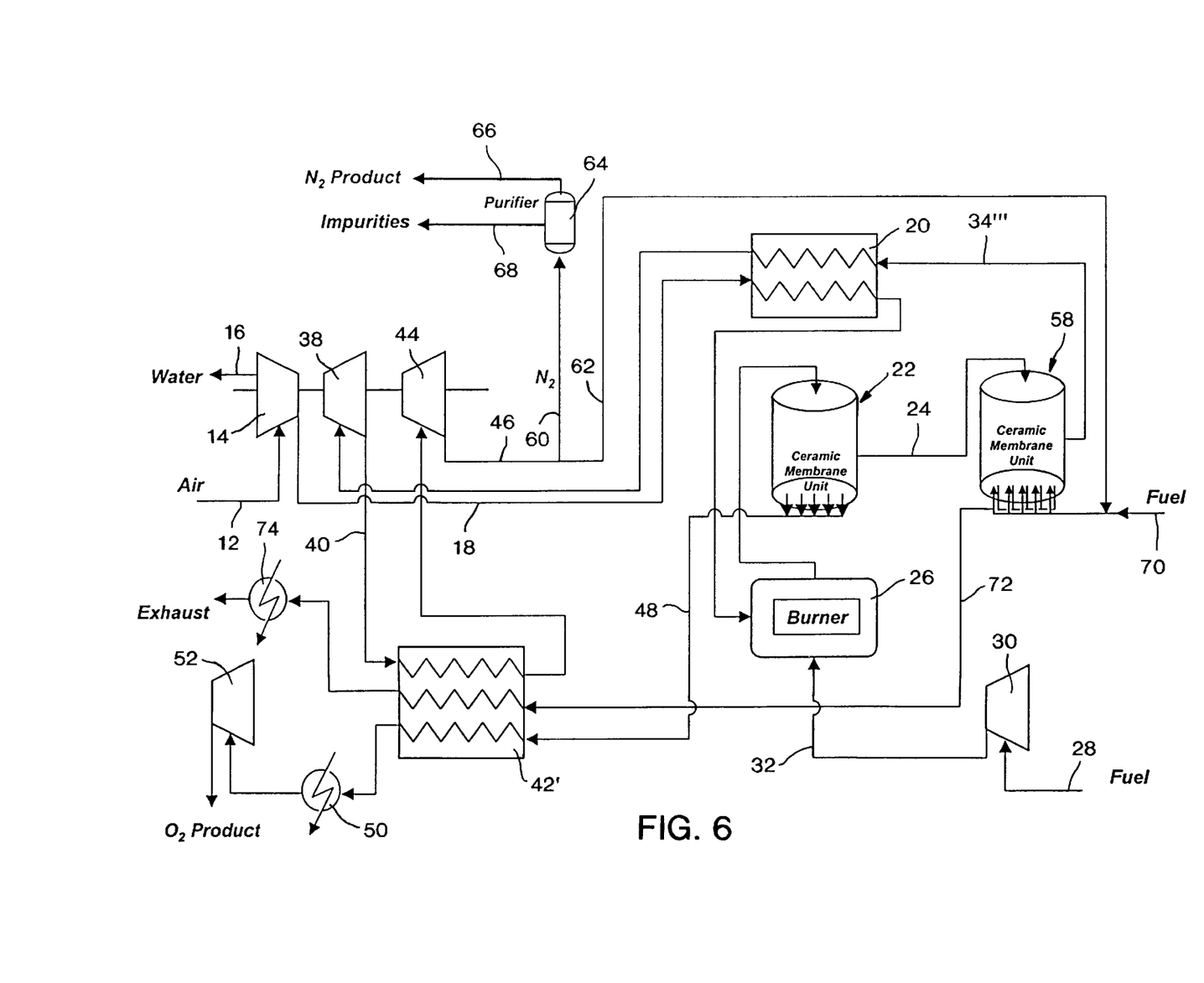
FIG. 6 is a schematic, process flow diagram of an alternative embodiment of the method illustrated by FIG. 3 that additionally incorporates a further ceramic membrane unit to separate further oxygen from the feed and thereby allow the production of a nitrogen product.

With reference to FIG. 6, an embodiment of the present invention is illustrated that is designed to co-produce oxygen and nitrogen. In some aspects, it is similar to the embodiments shown in FIGS. 2 and 3 except that process stream 34'" has much less oxygen due to further processing that will be described.

Retentate stream 24 is introduced into a further ceramic membrane unit 58 that functions as a de-oxo unit to remove any further residual oxygen contained within retentate stream 24, thereby producing process stream 34'" which is a retentate stream of ceramic membrane unit 58. Process stream 34'", after its initial and subsequent expansions, produces an exhaust stream 46 which is divided into first and second nitrogen containing streams 60 and 62, respectively. First nitrogen containing stream 60 is introduced into a purifier 64 to produce a nitrogen product stream 66. The impurities are rejected as a stream 68. The purifier can be any unit, conventional or otherwise, that is designed to remove any of the residual components that may be present in the nitrogen product stream 60. The second nitrogen containing stream 62 is combined with a fuel stream 70 and introduced into ceramic membrane unit 58 for combustion supported by permeated oxygen. This combustion consumes oxygen to lower the oxygen partial pressure, thereby increasing the degree of separation. The increased degree of separation can be expressed as either a purer process stream 34''' or a lower compression requirement for feed air compressor 14. Additionally, the combustion also heats ceramic membrane unit 58 to its operational temperature.

The resultant heated exhaust stream 72, containing combustion products formed from the combustion in ceramic membrane unit 58, then can be introduced into an expander interstage heater 42' that is provided with a pass for heated exhaust stream 72 to help reheat process stream 34''' in the form of turbine exhaust 40. Heated exhaust stream 72, after passage through expander interstage heater 42', then subsequently may be cooled further in an aftercooler 74.

Figure 7:
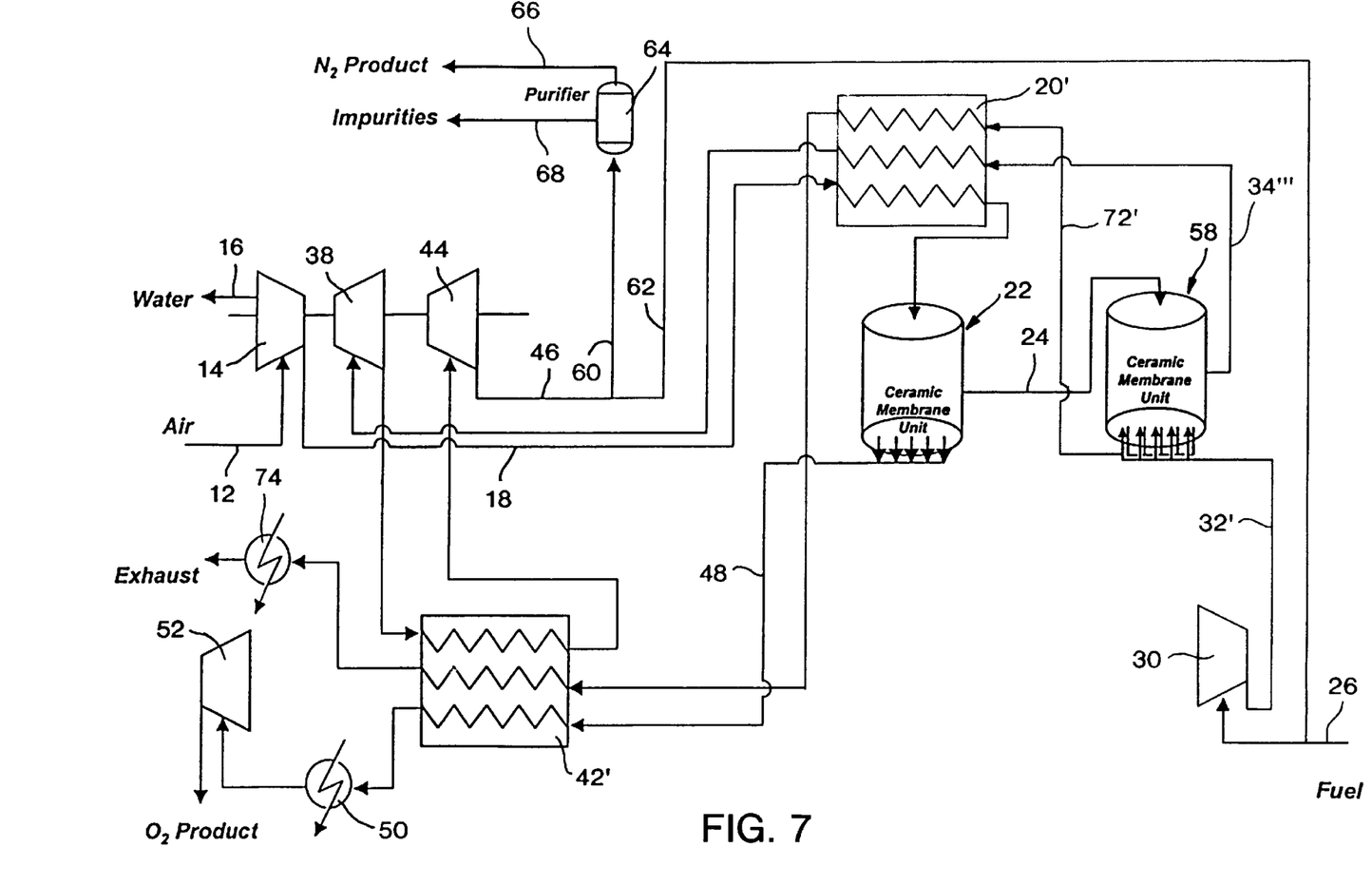
FIG. 7 is a schematic, process flow diagram of an alternative embodiment of the method illustrated by FIG. 6 that does not use a direct fired burner.

FIG. 7 illustrates an alternative embodiment of a process flow diagram shown in FIG. 6. The embodiment illustrated in this figure does not use a direct fired burner. Instead, fuel stream 26 is diluted with second nitrogen containing stream 62, and then compressed within fuel compressor 30. The resultant compressed fuel stream 32' is introduced into oxygen transport membrane unit 58 for purposes that are identical to those illustrated in FIG. 6 for the introduction of compressed fuel stream 32. The resultant heated exhaust stream 72' then is passed through a feed heater 20' having an extra pass for such stream, thereby to help heat compressed feed stream 18. The heated exhaust stream 72' then is passed through expander interstage heater 42' to help the interstage reheating of process stream 34'''.

In a modification of the process shown in FIG. 7, a heat exchange pass may be included inside the ceramic membrane unit 58. Prior to entering the ceramic membrane unit 22, the heated compressed feed stream 18 is heated further by indirect heat exchange with the heated exhaust stream 72' that is formed inside ceramic membrane unit 58.

In yet another possible modification, part of exhaust stream 40, prior to being reheated, could be taken as a product and then purified. The remainder would be heated in an expander interstage heater of similar design to expander interstage heater 42, having two passes. The remainder of exhaust stream 40, after having been reheated, would be combined with heated exhaust stream 72' and such resultant combined stream would be introduced into turboexpander 44. This process is useful in situations in which the required delivery pressure for a nitrogen product gas is equal to the pressure of the nitrogen product stream that exits the initial expansion stage, thereby eliminating the need to recompress the product nitrogen. Furthermore, by combining the heated exhaust stream 72' with the waste nitrogen stream 35', aftercooler 74 is eliminated.

Figure 8:
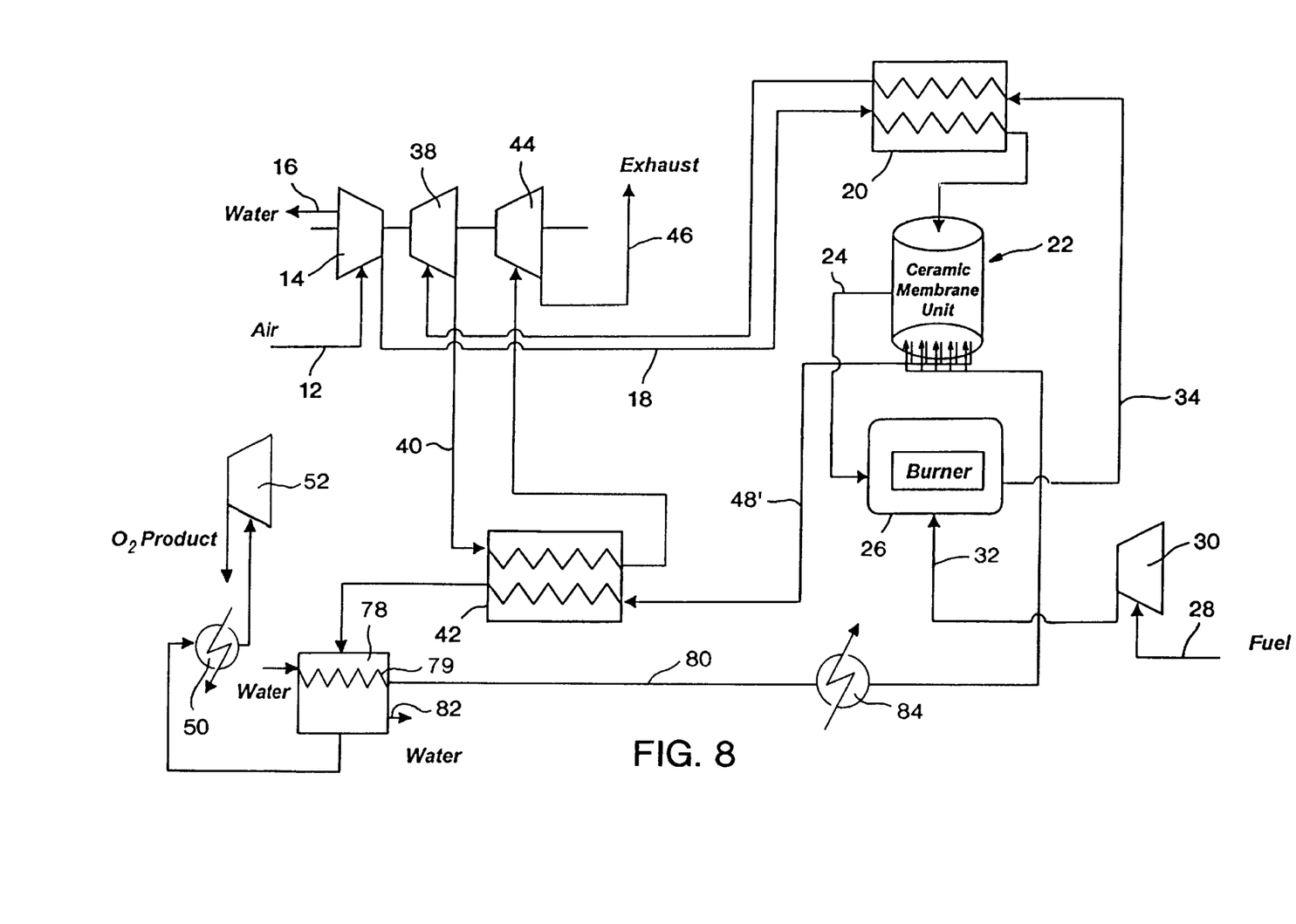
FIG. 8 is a schematic, process flow diagram of an alternative embodiment of the method illustrated by FIG. 1 that uses a steam purge in the ceramic membrane unit.

FIG. 8 represents the embodiment based on FIG. 1 in which a steam purge is used in order to aid oxygen separation within an oxygen transport membrane unit 22. The steam purge produces a permeate containing moisture and, therefore, a moisture containing oxygen product stream 48'. After passage through expander interstage heater 42, water is condensed from moisture containing oxygen product stream 48' in a condenser 78. Condenser 78 contains a heat exchange pass 79 to heat an incoming water stream into a stream 80 made up of steam. The heating cools moisture containing oxygen product stream 48' to condense water which is illustrated by a stream 82. Stream 80 is heated further within a heater 84 and introduced into the oxygen transport membrane unit 22. The steam sweeps the oxygen permeate from the oxygen transport membranes contained within ceramic membrane unit 22 to lower the oxygen pressure, thereby increasing the degree of oxygen separation.

Figure 9:
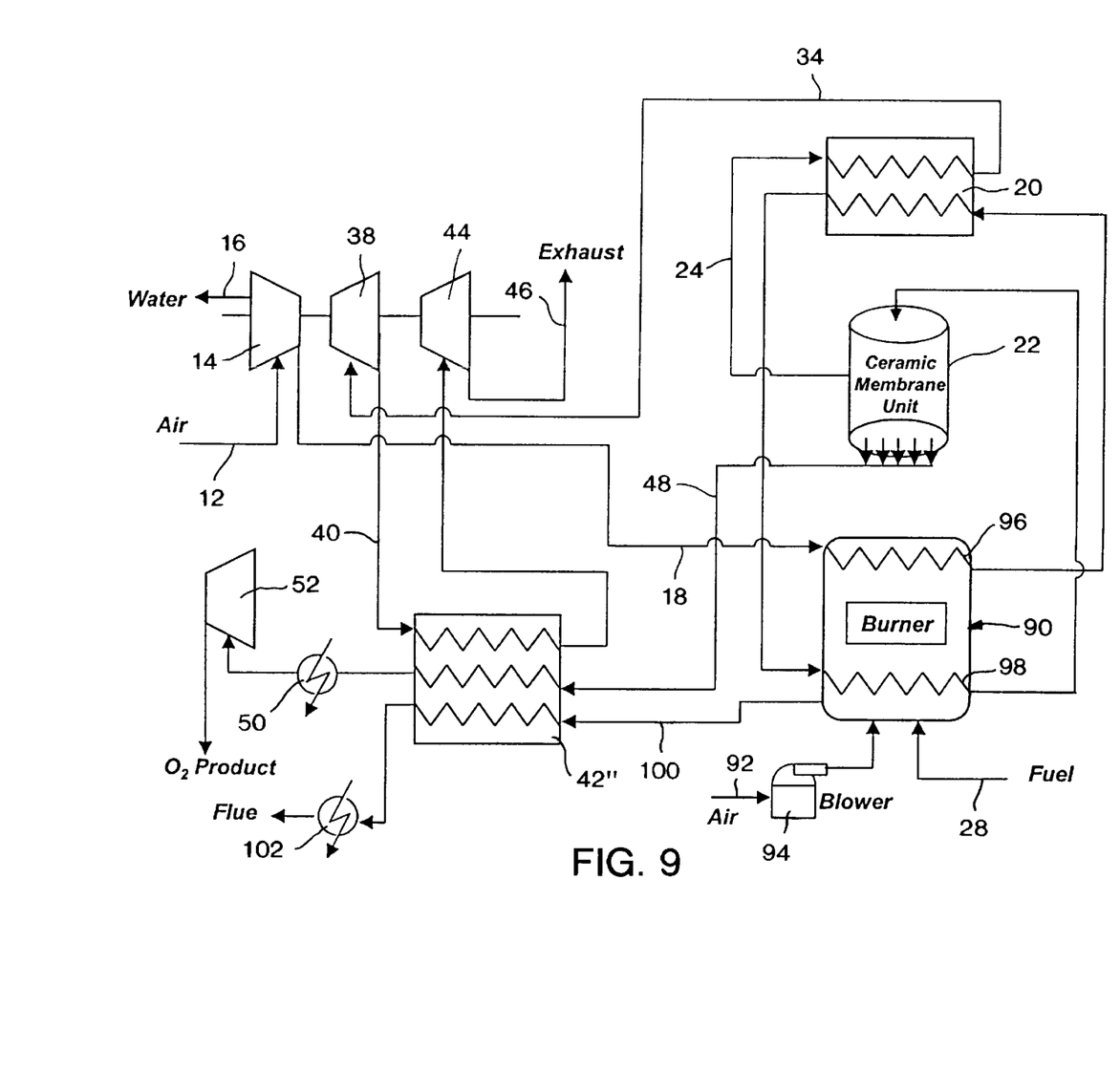
FIG. 9 is a schematic, process flow diagram of an apparatus used in carrying out a method in accordance with the present invention that uses a low pressure burner.

With reference to FIG. 9, a low pressure burner is utilized in which an auxiliary air stream 92 is introduced into low pressure burner 90 by way of a blower 94 together with fuel stream 28. Low pressure burner 90 has a pass 96 for heating compressed feed stream 18 which is subsequently heated further in feed heater 20, and then yet heated further within a pass 98 of low pressure burner 90. The resultant heated compressed feed stream 18 then is introduced into ceramic membrane unit 22. Combustion taking place within low pressure burner 90 produces a heated flue gas stream 100 which is introduced into an expander interstage heater 42'' that is provided with a pass for such purpose. Heated flue gas stream 100 is thereafter cooled by an aftercooler 102. Alternatively, stream 92 could be any oxygen-containing gas, such as exhaust stream 46, which still may contain oxygen and have useful thermal energy that can be used to improve the overall thermal efficiency of the process.

Figure 10:
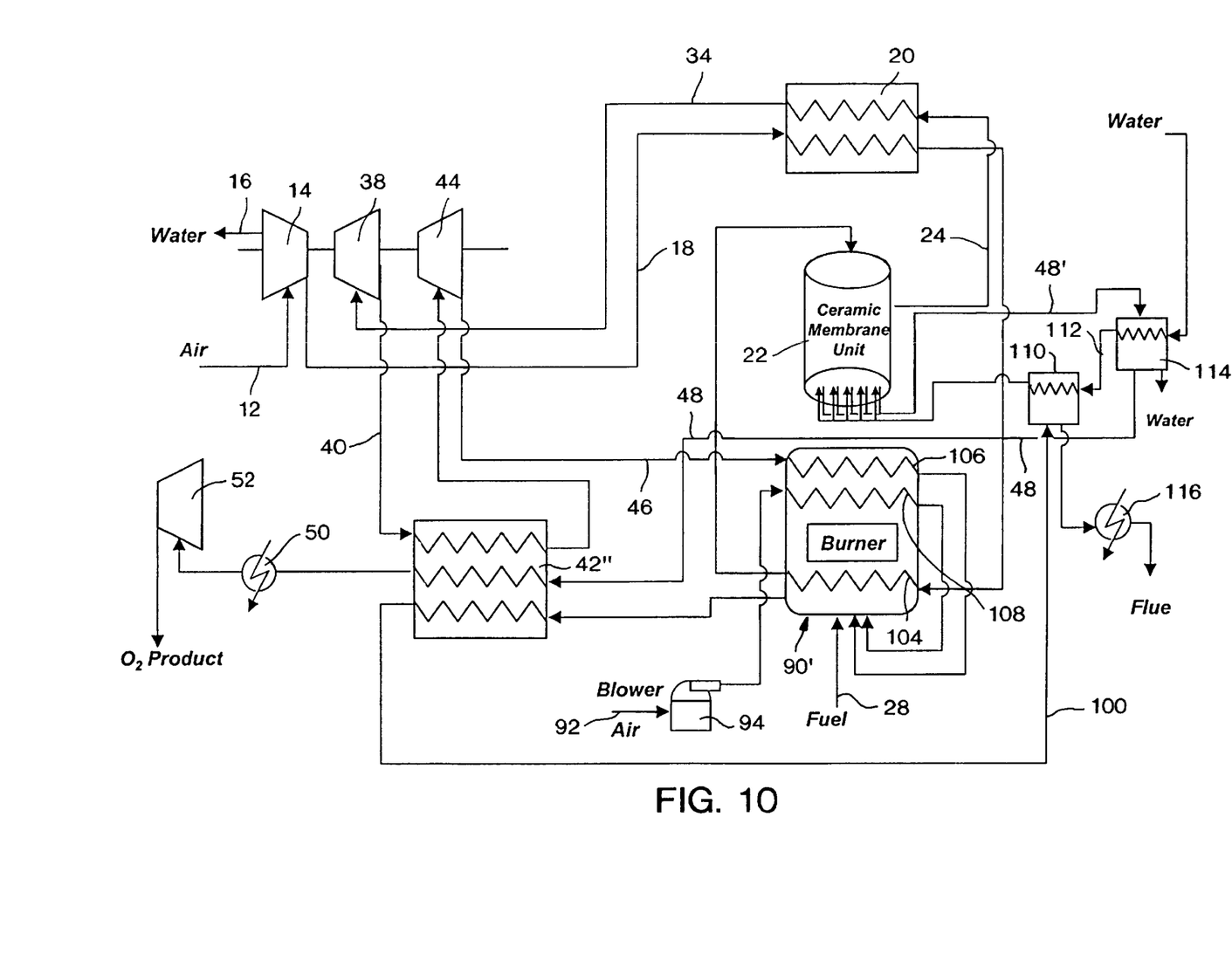
FIG. 10 is a schematic, process flow diagram of an apparatus used in carrying out a method in accordance with the present invention that utilizes a low pressure burner and steam purge within the ceramic membrane unit.

With reference to FIG. 10 a low pressure burner 90' is illustrated that is used in conjunction with a steam purge for ceramic membrane unit 22. In this embodiment low pressure burner 90' is provided with a heat exchange pass 96 in which the compressed feed stream 18, after having been heated within feed heater 20, serves to heat further compressed feed stream 18 prior to its introduction into ceramic membrane unit 22. Heat exchange passes 106 and 108 are also provided to preheat exhaust stream 46 and auxiliary air stream 92 for introduction into low pressure burner 90' to help support combustion of the fuel.

Heated flue gas stream 100 after having been cooled within expander interstage heater 42'' then is passed through a heat exchanger 110 to superheat a stream 112 made up of steam. Stream 112 is produced within a condenser 114 in which moisture is removed from moisture containing oxygen product steam 48' to produce oxygen product stream 48. The resultant superheated steam then is introduced into ceramic membrane unit 22. Heated flue gas stream 100 is further cooled within an aftercooler 116. Alternatively, stream 92 could be any oxygen-containing gas, such as exhaust stream 46, which still may contain oxygen and have useful thermal energy that can be used to improve the overall thermal efficiency of the process.

Figure 11:
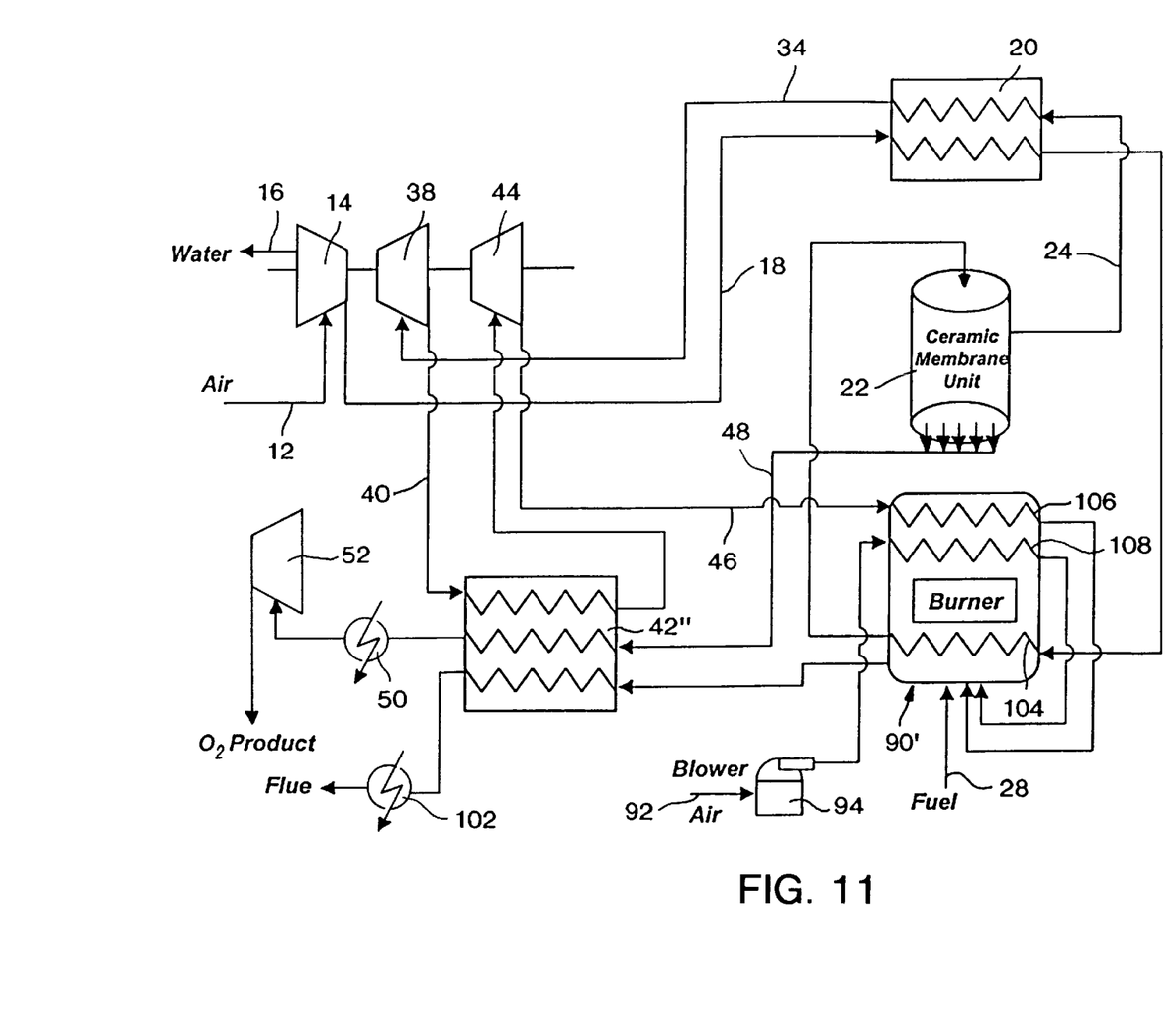
FIG. 11 is an alternative embodiment of the method illustrated by FIG. 10 that does not use a steam purge in the ceramic membrane unit.

With reference to FIG. 11, an embodiment of the present invention is illustrated that is based upon the use of low pressure burner 90' illustrated in FIG. 10. The difference between the two embodiments is that a steam purge is not used. Alternatively, stream 92 could be any oxygen-containing gas, such as exhaust stream 46, which still may contain oxygen and have useful thermal energy that can be used to improve the overall thermal efficiency of the process.

The following table illustrates an exemplary process conducted with the process flow diagram illustrated for FIG. 1. Table 2 illustrates the power required and recovered in the various illustrated components.

TABLE 1

| Stream | Location | Pressure | Temperature |
|---|---|---|---|
| 18 | After compressor 14 | 200–500 psia | |
| 18 | After feed heater 20 | | 600° C.–1200° C. |
| 48 | After ceramic membrane unit 22 | 14–20 psia | 600° C.–1200° C. |
| 24 | After oxygen transport membrane unit 22 | 180–500 psia | 600° C.–1200° C. |
| 48 | After expander interstage heater 42 | | 120° C.–520° C. |
| 48 | After aftercooler 50 | | 50° C. |
| 48 | After compressor 52 | 30–100 psia | |
| 32 | | 180–500 psia | |
| 34 | Prior to feed heater 20 | 175–500 psia | 800° C.–1600° C. |
| 34 | After cooling in feed heater 20 | | 350° C.–650° C. |
| 40 | After turboexpander 38, but before expander interstage heater 42 | 35–120 psia | 180° C.–500° C. |
| 40 | After expander interstage heater 42, but prior to turboexpander 44 | | 350° C.–650° C. |
| 46 | | 14–15 psia | |

TABLE 2

| Turbomachinery | Power Required/Recovered (kW) |
|---|---|
| Feed Gas Compressor | 3728.7 |
| Oxygen Product Compressor | 196.5 |
| Fuel Compressor | 49.03 |
| First Expander Stage | 1864.35 |
| Second Expander Stage | 1864.35 |

While the present invention has been described with reference to preferred embodiments, as will occur to those skilled in the art, numerous changes, additions, and omissions may be made without departing from the present invention.

We claim:

1. A method of separating oxygen from an oxygen containing gas, said method comprising:

compressing a feed stream containing said oxygen containing gas to produce a compressed feed stream;

heating said compressed feed stream;

heating a ceramic membrane unit to an operational temperature and forming, within the ceramic membrane unit, an oxygen permeate composed of at least a portion of the oxygen contained within the compressed feed stream and a retentate containing at least in part residual components of said compressed feed stream;

cooling a process stream composed of at least a portion of the residual components of said retentate to a temperature below said operational temperature;

expanding said process stream with the performance of work in an initial stage of expansion to form an expansion exhaust stream;

reheating said expansion exhaust stream after said initial stage of expansion;

expanding said expansion exhaust stream after having been reheated with the performance of work in a subsequent stage of expansion;

the work of expansion produced by the initial stage of expansion being insufficient to meet power requirements for the compression of the feed stream, and a sum of the work of expansion of the initial and subsequent expansion stages being at least sufficient to meet said power requirements for the compression of the feed stream;

applying at least part of the sum of the work of expansion of the initial and subsequent stages of expansion to the compression of the feed stream; and extracting an oxygen product stream from said ceramic membrane unit composed of said oxygen permeate.

2. The method of claim 1, wherein:

the residual components include residual oxygen;

said process stream is formed by extracting a retentate stream from said ceramic membrane unit, introducing a fuel stream into said retentate stream and combusting the fuel stream in the presence of said residual oxygen contained within said retentate stream;

said compressed feed stream is heated through indirect heat exchange with said process stream thereby cooling said process stream; and said compressed feed stream, after having been heated, is introduced into said ceramic membrane unit to separate part of the oxygen contained within said compressed feed stream to form said oxygen permeate and thereby to heat said ceramic membrane unit to said operational temperature.

3. The method of claim 1, wherein:

said process stream is formed from a retentate stream composed of said retentate and extracted from said ceramic membrane unit;

said compressed feed stream is heated through indirect heat exchange with said process stream thereby cooling said process stream;

a heated feed stream is formed by introducing a fuel stream into said compressed feed stream after having been heated and combusting said fuel stream in the presence of part of the oxygen contained within said compressed feed stream; and said heated feed stream is introduced into said ceramic membrane unit to separate a remaining part of the oxygen contained within said compressed feed stream, thereby to form said oxygen permeate and thereby to heat said ceramic membrane unit to said operational temperature.

4. The method of claim 1, wherein:

said residual components include residual oxygen;

said compressed feed stream is heated through indirect heat exchange with a retentate stream extracted from said ceramic membrane unit;

said compressed feed stream after having been heated is divided into first and second subsidiary streams;

said process stream is formed by combining said retentate stream with said first subsidiary stream and a fuel stream, and combusting said fuel stream in the presence of oxygen contained in said retentate stream and said first subsidiary stream;

said second subsidiary stream is indirectly heated from the combustion of said fuel stream, thereby cooling said process stream; and said second subsidiary stream is introduced into said ceramic membrane unit to separate the oxygen contained therein to form said oxygen permeate and thereby to heat said ceramic membrane unit to said operational temperature.

5. The method of claim 1, or claim 2, or claim 3, or claim 4, wherein said expansion exhaust stream is reheated through indirect heat exchange with said oxygen product stream.

6. The method of claim 2, or claim 3, or claim 4, wherein:

said sum of said work of expansion is in excess of that required to compress said feed stream;

said fuel stream and oxygen product stream are compressed; and said sum of said work of expansion is additionally applied to compression of said fuel stream and oxygen product stream.

7. The method of claim 6, wherein said expansion exhaust stream is reheated through indirect heat exchange with said oxygen product stream.

8. The method of claim 1, or claim 2, or claim 3, or claim 4, wherein said oxygen membrane system is purged with a reactive or non-reactive purge stream to increase the separation of the oxygen.

9. The method of claim 1, wherein:

a retentate stream is extracted from said ceramic membrane unit and introduced into a further ceramic membrane unit;

a reactive purge stream is introduced into said further ceramic membrane unit to separate further oxygen from said retentate stream and thereby to produce a further retentate and combustion products;

said process stream is formed from said further retentate;

said compressed feed stream is heated through indirect heat exchange with said process stream and a heated exhaust stream composed of said combustion products;

said compressed feed stream after having been heated is introduced into said ceramic membrane unit to separate the oxygen therefrom and thereby to heat said ceramic membrane unit to said operational temperature; and a nitrogen product stream is formed at least in part from a subsequent expansion exhaust stream produced from said subsequent expansion.

10. The method of claim 9, wherein said expansion exhaust stream is reheated through indirect heat exchange with said product stream and said heated exhaust stream after said expansion exhaust stream has exchanged heat with said compressed feed stream.

11. The method of claim 10, wherein:

said sum of said work of expansion is in excess of that required to compress said feed stream;

said subsequent expansion exhaust stream is divided into first and second nitrogen containing streams;

the first nitrogen containing stream forms said nitrogen product stream;

said reactive purge stream is formed from a fuel stream and said second nitrogen containing stream;

said reactive purge and oxygen product streams are compressed; and said sum of said work of expansion is additionally applied to compression of said reactive purge and oxygen product streams.

12. The method of claim 1, wherein:

said compressed feed stream is heated through indirect heat exchange with said process stream;

a heated feed stream is formed by introducing a fuel stream into said compressed feed stream after having been heated and said fuel is combusted in the presence of part of the oxygen contained within said compressed feed stream;

said heated feed stream is introduced into said ceramic membrane unit to separate a remaining part of the oxygen contained within said compressed feed stream and thereby to heat said ceramic membrane unit to said operational temperature;

a retentate stream is extracted from said ceramic membrane unit and introduced into a further ceramic membrane unit;

a reactive purge stream is introduced into said further ceramic membrane unit to separate further oxygen from said retentate stream and thereby to produce a further retentate and combustion products;

said process stream is formed from said further retentate; and a nitrogen product stream is formed from at least part of said process stream.

13. The method of claim 12 wherein said nitrogen product stream is formed from a subsequent expansion exhaust stream produced from said subsequent expansion.

14. The method of claim 13, wherein said process stream is reheated through indirect heat exchange with said product stream and a heated exhaust stream formed from said combustion products.

15. The method of claim 14, wherein:

said sum of said work of expansion is in excess of that required to compress said feed stream;

a first nitrogen containing stream composed of part of the process stream forms said nitrogen product stream;

said reactive purge stream is formed from a further fuel stream and a second nitrogen containing stream composed of a further part of said process stream;

said fuel and oxygen product streams are compressed; and said sum of said work of expansion is additionally applied to compression of said fuel and oxygen product streams.

16. The method of claim 1, wherein:

said process stream is formed from a retentate stream composed of said retentate and extracted from said ceramic membrane unit;

said compressed feed stream is heated through indirect heat exchange with heat generated through combustion of a fuel and through indirect heat exchange with said process stream thereby cooling said process stream; and said process stream is reheated through indirect heat exchange with a flue gas stream composed of flue gas produced from the combustion of the fuel and the oxygen product stream.

17. The method of claim 16, further comprising heating said compressed feed stream through further indirect heat exchange with said heat generated through combustion of the fuel so that said compressed feed stream initially undergoes the indirect heat exchange with the process stream and subsequently undergoes the indirect heat exchange with heat generated through combustion of the fuel, prior to the further indirect heat exchange.

18. The method of claim 16 or claim 17, wherein said ceramic membrane unit is subjected to a purge with steam to increase the oxygen separation.

19. The method of claim 17, wherein said process stream and an auxiliary air stream are preheated through indirect heat exchange with said heat generated through the combustion of the fuel and are then used to support the combustion of the fuel.

20. The method of claim 1, or claim 2, or claim 3, or claim 4, or claim 16, wherein:

said operational temperature is in a range from between about 600° C. and about 1200° C.;

said temperature below said operational temperature to which said process stream is cooled is in a range of between about 300° C. and about 650° C.; and said process stream is reheated, after said initial stage of expansion, to a reheated temperature in a range of between about 350° C. and about 650° C.

* * * * *